United States Patent
Hong et al.

(10) Patent No.: US 8,208,489 B2
(45) Date of Patent: Jun. 26, 2012

(54) METHOD FOR REPORTING DOWNSTREAM PACKET RESEQUENCING STATUS IN CABLE MODEM

(75) Inventors: Seung Eun Hong, Daejeon (KR); Ho Jin Kwon, Seoul (KR); O Hyung Kwon, Daejeon (KR); Soo In Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 489 days.

(21) Appl. No.: 11/978,855

(22) Filed: Oct. 29, 2007

(65) Prior Publication Data
US 2008/0130681 A1 Jun. 5, 2008

(30) Foreign Application Priority Data

Dec. 5, 2006 (KR) .................. 10-2006-0122022
May 25, 2007 (KR) .................. 10-2007-0050778

(51) Int. Cl.
*H04J 3/22* (2006.01)
(52) U.S. Cl. .................. 370/468; 370/476; 370/394
(58) Field of Classification Search .................. 370/394, 370/468, 476
See application file for complete search history.

(56) References Cited

U.S. PATENT DOCUMENTS

| | | | | |
|---|---|---|---|---|
| 5,337,313 | A * | 8/1994 | Buchholz et al. | 370/394 |
| 6,909,715 | B1 | 6/2005 | Denney et al. | |
| 6,915,358 | B2 | 7/2005 | Horton et al. | |
| 7,242,694 | B2 * | 7/2007 | Beser | 370/449 |
| 2002/0034182 | A1 * | 3/2002 | Mallory | 370/394 |
| 2004/0244043 | A1 | 12/2004 | Lind et al. | |
| 2005/0078682 | A1 * | 4/2005 | Kim et al. | 370/395.5 |
| 2006/0064621 | A1 * | 3/2006 | Fuhs et al. | 714/748 |
| 2006/0221833 | A1 | 10/2006 | Jiang | |
| 2006/0262795 | A1 * | 11/2006 | Mamillapalli et al. | 370/390 |

FOREIGN PATENT DOCUMENTS

| | | |
|---|---|---|
| KR | 1020000034472 | 6/2000 |
| KR | 1020000045163 | 7/2000 |
| KR | 1020050047646 | 5/2005 |

OTHER PUBLICATIONS

CM-SP-MULPv3.0-I01-060804; Data-Over-Cable Service Interface Specifications; CableLabs; Aug. 4, 2006.

\* cited by examiner

*Primary Examiner* — Dang Ton
*Assistant Examiner* — Pamit Kaur
(74) *Attorney, Agent, or Firm* — Blakely, Sokoloff, Taylor & Zafman

(57) ABSTRACT

Provided is a method by which a cable modem reports a downstream packet resequencing status to a cable modem termination system, and more particularly, a method of effectively reporting detailed information on a packet resequencing status by further defining a packet resequencing-related event and event-related information in a message reporting the packet resequencing status. The method by which a cable modem reports a resequencing status of the resequenced packets includes the steps of: when a packet resequencing-related event occurs, generating a resequencing status message (CM-STATUS) including packet sequence numbers of packets causing the event; transmitting a band allocation request message for requesting a cable modem termination system to allocate an upstream band for transmission of the resequencing status message; and transmitting the resequencing status message to the cable modem termination system over the upstream band allocated by the band allocation request message. More detailed resequencing status information, such as the remaining capacity of the receive buffer and the resequenced packet map, for more packet resequencing-related events compared to the conventional downstream packet resequencing status reporting method, is transmitted to the CMTS, such that the CMTS copes more flexibly with situations that may occur upon packet resequencing.

8 Claims, 13 Drawing Sheets

FIG. 4B
(PRIOR ART)

| Type= 1 | Length= | | | 440 |
|---|---|---|---|---|
| Type= 1.1 | Length= 1 | Channel ID | | 441a |
| Type= 1.2 | Length= 4 | Frequency | | 441b |
| Type= 1.3 | Length= 1 | Modulation order/addition | | 441c |
| Type= 1.4 | Length= 1 | Main role | | 441d |
| Type= 1.5 | Length= 2 | CM-STATUS event enable bitmask | | 442 |
| Type | Length | ... | | |

| Type= 11 | Length= 10 | | | 460 |
|---|---|---|---|---|
| Type= 11.1 | Length= 1 | Event type code | | 461 |
| Type= 11.2 | Length= 2 | Maximum event hold-off timer | | 462 |
| Type= 11.3 | Length= 1 | Maximum number of reports-per-event | | 463 |

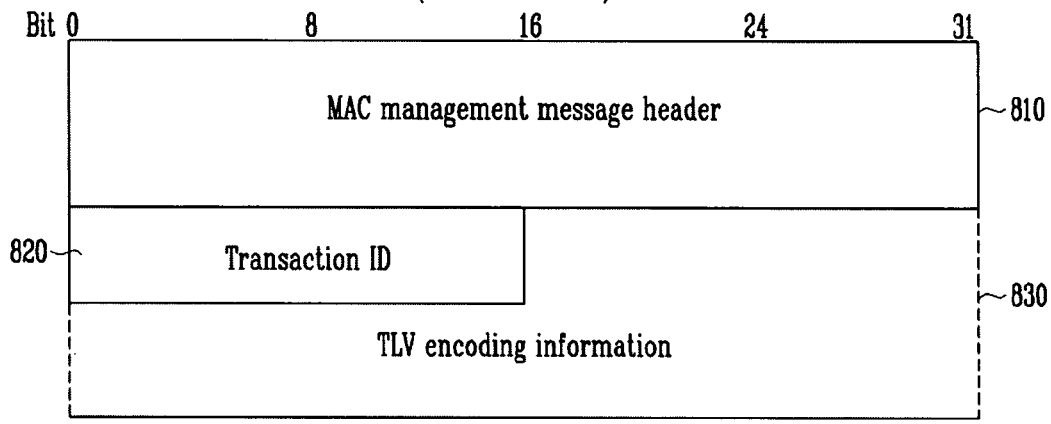

FIG. 9

| Type= 50 | Length= 50 | | |
|---|---|---|---|
| Type= 50.1 | Length= 3 | DSID | 525 |
| Type= 50.2 | Length= 1 | DSID action | 530 |
| Type= 50.3 | Length= | | 535 |
| Type= 50.3.1 | Length= 1 | Resequencing DSID indication | 540 |
| Type= 50.3.2 | Length= n | Resequencing channel list | 545 |
| Type= 50.3.3 | Length= 1 | Resequencing wait time | 550 |
| Type= 50.3.4 | Length= 1 | Resequencing warning threshold | 555 |
| Type= 50.3.5 | Length= 2 | CM-STATUS maximum event hold-off timer for sequence-out-of-range events | 560 |
| Type= 50.3.6 | Length= 2 | CM-STATUS maximum event hold-off timer for rapid loss detection events | 910 |
| Type= 50.3.7 | Length= 2 | Reporting period for periodic resequencing status reporting | 920 |
| Type= 50.3.8 | Length= 2 | SID for periodic resequencing status reporting | 930 |
| Type= 50.3.9 | Length= 2 | CM-STATUS maximum event hold-off timer for resequencing packet timeout event | 940 |

905

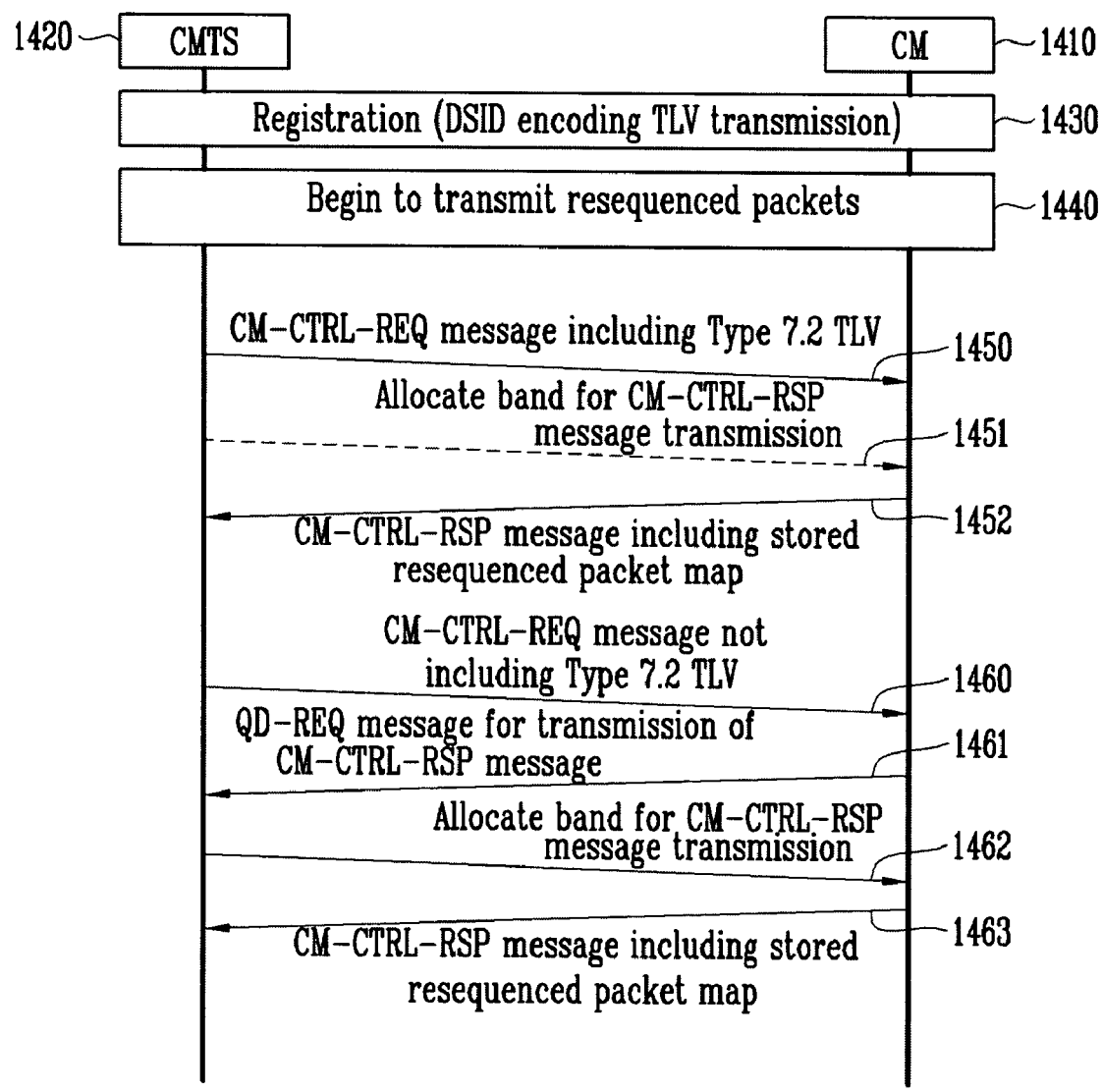

METHOD FOR REPORTING DOWNSTREAM PACKET RESEQUENCING STATUS IN CABLE MODEM

CROSS-REFERENCE TO RELATED APPLICATION

This application claims priority to and the benefit of Korean Patent Application No. 2006-122022, filed Dec. 5, 2006, and No. 2007-50778, filed May 25, 2007, the disclosure of which is incorporated herein by reference in its entirety.

BACKGROUND

1. Field of the Invention

The present invention relates to a method by which a cable modem ("CM") reports a downstream packet resequencing status to a cable modem termination system ("CMTS"), and more particularly, to a method of effectively reporting detailed information on a packet resequencing status by further defining a packet resequencing-related event and event-related information in a message reporting the packet resequencing status.

The present invention has been produced from the work supported by the IT R&D program of MIC (Ministry of Information and Communication)/IITA (Institute for Information Technology Advancement) [2006-S-019-01, The Development of Digital Cable Transmission and Receive System for 1 Gbps Downstream] in Korea.

2. Discussion of Related Art

In general, a cable modem network attracts attention together with an integrated services digital network (ISDN), a multi digital subscriber line (xDSL), and the like in the field of remote connections. The cable modem network provides a variety of services, such as working from home, video conferencing, web surfing and the like, to subscribers at a high data rate on the order of Mbps in connection with the Internet or an Intranet.

A cable modem network is widely used in the U.S. and may be based upon a cable television (CATV) network for data communications. The cable modem network is similar to the CATV network in that it uses a coaxial cable. However, in the CATV network, an external coaxial cable is connected to a set top box, which is then connected with a television (TV), and in the cable modem network, a cable modem is used to connect a coaxial cable with a personal computer (PC). In this case, one or more PCs may be connected to the cable modem.

Referring to FIG. 1, a cable network may include a cable modem (CM) 120 for allowing a user to transmit and receive data, and a cable modem termination system (CMTS) 110 connected to a wide area network for transmitting and receiving data to and from the user. The CMTS 110 is located at a headend and receives data from the CM 120 at home (upstream), and transmits data to the CM 120 (downstream).

The transmission of data packets from the CMTS 110 to the CM 120 may be made by a plurality of downstream channels (DC) rather than one channel. The CM 120 may resequence, in an original order, the packets received over the different channels.

FIG. 2 illustrates a cable modem network in which data transmission and reception is made over a plurality of downstream channels.

Referring to FIG. 2, the CMTS 210 receives packets from a network-side interface (NSI) 240. In the CMTS 210, a classifier 211 classifies the received packets into common packets 215 and resequenced packets 216.

The common packets 215 are directly delivered to a scheduler 213 of the CMTS 210 and then to the CM 220 via one downstream channel 214.

On the other hand, the resequenced packets 216 are first delivered to a sequencer/distributor 212 before being provided to the scheduler. The sequencer sequentially allocates a sequence number to the respective resequenced packets 216, and the distributor distributes the packets to the respective schedulers 213 according to a predetermined rule.

Each channel scheduler 213 of the CMTS 210 transmits the received packet over the downstream channel 214 according to a scheduler algorithm.

The CM 220 processes the packets received over the plurality of downstream channels 214 and transmits the packets to customer premise equipment (CPE).

In this way, the CM 220 receives the common packets from the single channel and the resequenced packets from the plurality of channels. Since the resequenced packets are distributed by the CMTS 210 to the plurality of channels, the received packets at the CM 220 may differ in sequence from the packets input from the network-side interface 240 to the CMTS 210 depending on settings of the schedulers and the downstream channels. In order to transmit the packets to the customer premise equipment in the same sequence input from the network-side interface 240 to the CMTS 210, the CM 220 may perform a packet resequencing process using information received from the CMTS 210 and information included in the packets.

In an initialization process, the CMTS 210 transmits a downstream service ID ("DSID") to the CM 220, so that the packet resequencing process is performed. The CMTS 210 then includes the DSID together with a packet sequence number ("PSN") for resequencing in the resequenced packets and transmits the resultant resequenced packets to the CM 200. The CM 220 may perform the packet resequencing process based on such information.

FIG. 3 illustrates a format of the resequenced packet transmitted from the CMTS to the CM.

Referring to FIG. 3, the resequenced packet includes a MAC header 310 and MAC data 320.

The MAC header includes a frame control (FC) field 311 indicating a type of a frame and the presence of an extended header (EHDR), a MAC parameter field (MAC_PARM) 312 indicating a length of the EHDR, a length field (LEN) 313 indicating a total length of the frame, a header check sequence (HCS) field 314 for error check of the MAC header 310, and the EHDR 315 having packet resequencing information and output priority information. The EHDR 315 includes a 4-bit EHDR type field EH_Type, a 4-bit length field EH_LEN, a 3-bit traffic priority field, a 1-bit sequence change counter ("SCC") field, a 20-bit DSID field, and a 16-bit PSN field.

FIGS. 4a and 4b illustrate a format of a MAC domain description (MDD) message transmitted from the CMTS to the CM, and a type/length/value (TLV) format, respectively. The MDD message is periodically transmitted from the CMTS to the CM over each downstream channel, and mainly used by the CM in an initialization process for transmission between the CMTS and the CM.

Referring to FIG. 4a, the MDD message, which is transmitted from the CMTS to the CM over a primary downstream channel, includes a MAC management header 410, fixed fields 420, and TLV encoding information 430 containing MAC domain information.

FIG. 4b illustrates a TLV format related to the control of transmission of a CM-STATUS message in the TLV encoding information 430 for reporting a resequenced packet status from the CM to the CMTS. Among sub TLVs of a downstream active channel list TLV 440 represented by Type=1, a CM-STATUS event enable bitmask TLV 442 of Type=1.5 (indicating that the CM-STATUS event enable bitmask TLV 442 is a sub TLV of Type=1 and has a type of 5) and a CM-STATUS event control TLV 460 represented by Type=11 describe information for controlling the transmission of the CM-STATUS message.

The CM-STATUS event enable bitmask TLV 442 consists of a 2-byte bitmask. For example, the DOCSIS 3.0 standard defines a fourth bit as a sequence-out-of-range event. The sequence-out-of-range event refers to an event occurring when resequenced packets cannot be stored in a receive buffer due to the limited capacity of the receive buffer.

Where the fourth bit is set to 1, the CM is required to transmit the CM-STATUS message when there is a sequence-out-of-range packet in the resequenced packets received over a downstream channel with a downstream channel ID ("DCID") indicated by the channel ID TLV 441*a*. If the fourth bit is 0, the CM does not transmit the CM-STATUS message even if there is the sequence-out-of-range packet.

The CM-STATUS event control TLV 460 includes sub TLVs, such as an event type code TLV 461 of type=11.1, a maximum event hold-off timer TLV 462 of type=11.2, and a maximum number of reports-per-event TLV 463 of type=11.3.

In an exemplary embodiment, the DOCSIS 3.0 standard defines that the event type code value of the sequence-out-of-range event is 3. When the event type code TLV 461 value in the MDD message is 3 and a sequence-out-of-range event occurs, the CM is required to perform CM-STATUS message transmission according to a process shown in FIG. 7 by using the maximum event hold-off timer TLV 462 value and the maximum number of reports-per-event TLV 463 value.

FIGS. 5*a* and 5*b* illustrate a format of a multipart registration response (REG-RSP-MP) message transmitted from the CMTS to the CM, and a TLV format, respectively. The REG-RSP-MP message is a message that the CMTS transmits to the CM in response to a registration request message (REG-REQ-MP) from the CM. The REG-RSP-MP message is used for registration of information required for the transmission between the CMTS and the CM.

Referring to FIG. 5*a*, the REG-RSP-MP message includes a MAC management header 505, fixed fields 510, and TLV encoding information 515 containing registration information.

FIG. 5*b* illustrates a format of a DSID encoding TLV in TLV information 515 forming the REG-RSP-MP message. The DSID encoding TLV 520 represented by Type=50 includes: sub TLVs, such as a DSID TLV 525 of type=50.1 indicating a DSID value; a DSID action TLV 530 of type=50.2 indicating addition, deletion or change of the DSID indicated in the DSID TLV 525; and a downstream resequencing encoding TLV 535 of type=50.3 describing whether resequencing is required and additive parameter information required for resequencing.

The downstream resequencing encoding TLV 535 includes sub TLVs. That is, the downstream resequencing encoding TLV 535 includes a resequencing DSID indication TLV 540 of type=50.3.1 indicating whether resequencing is required. In the case where resequencing is required, the downstream resequencing encoding TLV 535 further includes, as parameter information: a resequencing channel list TLV 545 indicating channels over which downstream packets with the DSID TLV 525 value can be transferred; a resequencing wait time TLV 550 of type=50.3.3; a resequencing warning threshold TLV 555 of type=50.3.4; and a CM-STATUS maximum event hold-off timer TLV 560 of type=50.3.5 for sequence-out-of-range events.

The maximum event hold-off timer TLV 462 of the MDD message is replaced with the CM-STATUS maximum event hold-off timer TLV 560.

FIGS. 6*a* and 6*b* illustrate a format of a CM control request (CM-CTRL-REQ) message transmitted from a CMTS to a CM in order to instruct to perform a specific activity and a TLV format, respectively.

Referring to FIG. 6*a*, the CM-CTRL-REQ message includes a MAC management message header 610, a fixed transaction ID field 620, and a TLV encoding information field 630.

FIG. 6*b* illustrates a format of a downstream status event enable bitmask override TLV related to transmission of the CM-STATUS message in TLV encoding information 630 of the CM-CTRL-REQ message. The downstream status event enable bitmask override TLV 640 represented by Type=5 includes sub TLVs, such as a DCID TLV 650 of type=5.1, and a downstream status event enable bitmask TLV 660 of type=5.2. The CM-STATUS event enable bitmask TLV 442 may be replaced with the downstream status event enable bitmask TLV 660.

In response to receipt of the CM-CTRL-REQ message, the CM is required to respond to the CMTS with a CM-CTRL-RSP message, which has the same format as the CM-CTRL-REQ message format as shown in FIG. 6*a*.

FIG. 7 illustrates a CM-STATUS event type state machine running on the CM. The CM-STATUS event type state machine is a kind of finite state machine (FSM) for determining, based on event-based state transition of the CM, whether the CM transmits a CM-STATUS message including resequenced packet status information.

Referring to FIG. 7, the CM operates the CM-STATUS event type state machine consisting of an IDLE 705 state and a SENDING 725 state for respective events allowing for transmission of the CM-STATUS message via an MDD message or a CM-CTRL-REQ message.

In the IDLE state 705, the CM has the transaction ID (TID) value of zero. When a state transitions from the IDLE state to an "on" state due to occurrence of an event of a specific type (710), the CM sets a ReportsLeft variable to a maximum number of reports defined for the event and a FirstReport control variable to True (715). The CM then selects any one value between 0 and the maximum hold-off value defined for the event and uses it as an initial reporting hold-off timer (720). The CM then transitions to a SENDING state and is kept in the SENDING state while the defined timer is operating (725).

Upon expiration of the hold-off timer in the SENDING state 725 (730), the CM determines whether the event type is kept in the "on" state (735). If the event is changed to an "off" state, the CM transitions to the IDLE state (705) instead of transmitting the CM-STATUS message.

If the event is kept in the "on" state, the CM determines whether a transmission of the CM-STATUS message is the first time (FirstReport=True) (740). If the transmission is the first time, the CM sets the FirstReport control variable to False and increments the TID value by one. The TID value can increase to 255 and then is reset to one (wraparound). If the FirstReport control variable value is False, the CM maintains the TID value unchanged.

The CM transmits the CM-STATUS message (745). The CM then determines whether the ReportsLeft variable value is zero (750). The zero means that the CM should transmit the CM-STATUS message unlimitedly until the event becomes "off". If the ReportsLeft value is not zero, the CM decrements the ReportsLeft value by one.

When the ReportsLeft variable value decrements from one to zero, the CM transitions to the IDLE state (705) in step 755. When the ReportsLeft variable value does not decrement from one to zero, the CM sets the hold-off timer to the maximum hold-off value (760).

Where the event of the relevant type is released and then regenerated prior to the expiration of the hold-off timer in the SENDING state 725 in step 765, the CM sets the ReportsLeft variable to a maximum reports value defined for the event again and sets the FirstReport control variable to True (770). Step 770 is the same as step 715, except that the SENDING state is maintained directly without step 720.

If the hold-off timer value for the event type is changed by the MDD message prior to the expiration of the hold-off timer in the SENDING state 725 in step 775, the CM proceeds to step 720.

If the transmission of the CM-STATUS message for the event type generation by the MDD message or CM-CTRL-REQ message is prohibited prior to the expiration of the hold-off timer in the SENDING state 725 in step 780, the CM transitions to the IDLE state (705) instead of transmitting the CM-STATUS message.

FIGS. 8*a* and 8*b* illustrate a format of a CM-STATUS message transmitted from the CM to the CMTS, and a TLV format, respectively. Here, the CM-STATUS message is a message that the CM transmits to report a resequencing status to the CMTS when a resequencing-related event occurs at the CM.

Referring to FIG. 8*a*, the CM-STATUS message includes a MAC management message header 810, a fixed transaction ID field 820, and a TLV encoding information field 830.

FIG. 8*b* illustrates a TLV format of event information causing transmission of the CM-STATUS message in the TLV encoding information 830 of the CM-STATUS message. The status event TLV 840 represented by Type=1 includes sub TLVs, such as an event type code TLV 845 of type=1.1, an event description TLV 850 of type=1.2 describing details of an event, a transaction ID TLV 855 of type=1.3, a downstream channel ID TLV 860 of type=1.4, an upstream channel ID TLV 865 of type=1.5, and a DSID TLV 870 of type=1.6.

In an exemplary embodiment, when a sequence-out-of-range event occurs at the CM and reporting a status of the sequence-out-of-range event via the MDD message or the CM-CTRL-REQ message is allowed, the CM generates the CM-STATUS message to the CMTS, which includes the event type code TLV 845 value set to 3, the transaction ID TLV 855 value set to a proper value, and the DSID TLV 870 value set to a DSID value to which a packet with an event belongs.

In the conventional cable network using the packets and messages of the format as described above, via the CM-STATUS message the CM notified the CMTS of only a sequence-out-of-range event among several events occurring upon receipt of the resequenced packets from the CMTS. In this case, only DSID information of a packet causing the event is notified via the CM-STATUS message. This allows the CMTS to only delete the packet causing the event by use of the information.

Moreover, the CM-STATUS message is not transmitted immediately after the event occurs. That is, the CM-STATUS message is not transmitted until the band is allocated in response to a queue-depth based resource request ("QD-REQ") message competitively transmitted for transmission of the CM-STATUS message generated at the time of expiration of the hold-off timer driven by the CM.

According to the reporting scheme used in the conventional cable network, the CM cannot rapidly report accurate information on various situations occurring upon the receipt of the resequenced packets to the CMTS. Furthermore, since the CMTS can receive the resequencing status information if, and only if, an event is generated from the CM, it cannot cope with problematic situations flexibly. In particular, in a CM comprising a receive buffer having limited capacity, a packet loss may be frequently caused by receive buffer overflow.

SUMMARY OF THE INVENTION

The present invention is directed to a method by which a CM rapidly reports to a CMTS more detailed information on several situations occurring in a packet resequencing process.

The present invention is also directed to a method for periodically reporting a remaining capacity of a receive buffer to a CMTS and reporting information on resequenced packets stored in the receive buffer to minimize a packet loss due to overflow in the receive buffer.

The present invention is also directed to a method by which a CMTS requests resequencing status information from a CM and the CM reports the resequencing status information in response to the request.

The present invention is also directed to a method for allocating an upstream band so that resequencing status information from a CM is rapidly reported.

One aspect of the present invention provides a method by which a cable modem reports a resequencing status of resequenced packets, the method comprising the steps of: when a packet resequencing-related event occurs, generating a resequencing status message (CM-STATUS) including packet sequence numbers of packets causing the event; transmitting a band allocation request message for requesting a cable modem termination system to allocate an upstream band for transmission of the resequencing status message; and transmitting the resequencing status message to the cable modem termination system over the upstream band allocated by the band allocation request message. Preferably, the event may comprise a rapid loss detection event.

Another aspect of the present invention provides a method by which a cable modem reports a resequencing status of resequenced packets, the method comprising the steps of: generating a resequencing status message at the cable modem in a predetermined period; allocating to the cable modem, by a cable modem termination system, an upstream band for transmission of the resequencing status message in the predetermined period; and transmitting the resequencing status message to the cable modem termination system over the allocated upstream band. Preferably, the allocating step may comprise allocating the upstream band by using a service ID for periodic reporting.

Still another aspect of the present invention provides a method by which a cable modem receiving resequenced packets over a plurality of channels reports a resequencing status of the resequenced packets, the method comprising the steps of: receiving a request message (CM-CTRL-REQ) from a cable modem termination system, the request message requesting the cable modem to report the resequencing status; generating a response message (CM-CTRL-RSP) in response to the request message; allocating to the cable modem, by the cable modem termination system, an upstream band for transmission of the response message; and transmitting the response message to the cable modem termination system over the allocated upstream band. Preferably, the request message may comprise upstream band allocation information for transmission of the response message, and the allocating step may comprise allocating the upstream band by using the upstream band allocation information.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which:

FIGS. 4a and 4b illustrate a format of a MDD MAC domain description message transmitted from the CMTS to the CM, and a type/length/value (TLV) format, respectively;

FIGS. 8a and 8b illustrate a format of a CM-STATUS message transmitted from a CM to a CMTS, and a TLV format, respectively;

FIG. 9 illustrates a DSID encoding-related TLV format of an REG-RSP-MP message according to an exemplary embodiment of the present invention;

FIG. 14 illustrates a process of exchanging a CM-CTRL-REQ message and a CM-CTRL-RSP message according to an exemplary embodiment of the present invention.

DETAILED DESCRIPTION OF EXEMPLARY EMBODIMENTS

Figure 1:
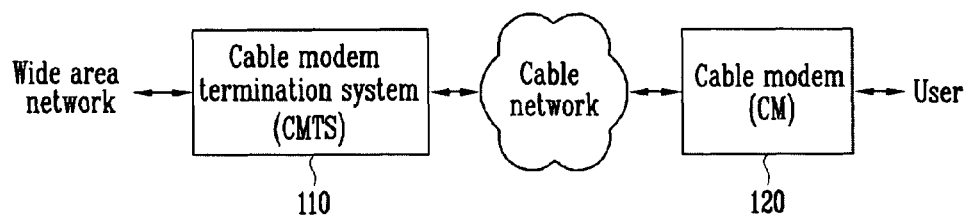
FIG. 1 is a block diagram of a typical cable modem network.
Figure 2:
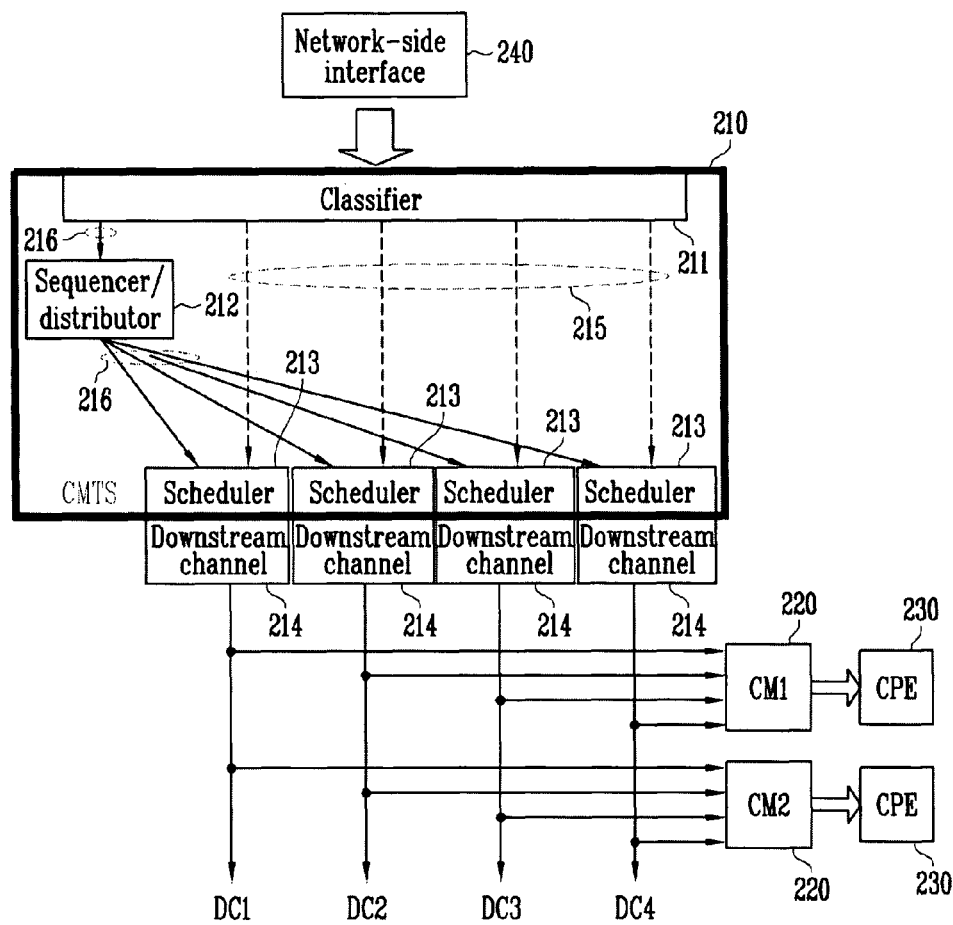
FIG. 2 illustrates a cable modem network in which data transmission and reception is made over a plurality of downstream channels.
Figure 3:
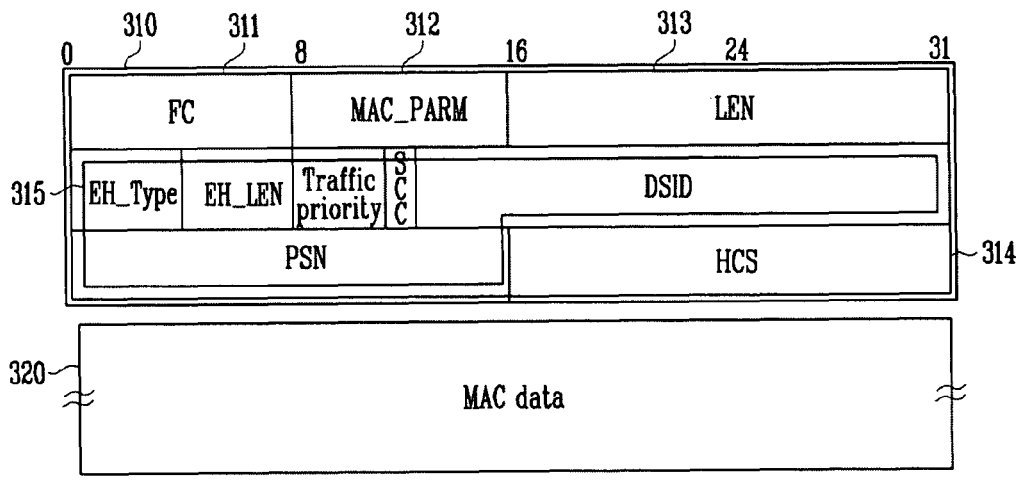
FIG. 3 illustrates a format of a resequenced packet transmitted from a cable modem termination system (CMTS) to a cable modem (CM)
Figure 4A:
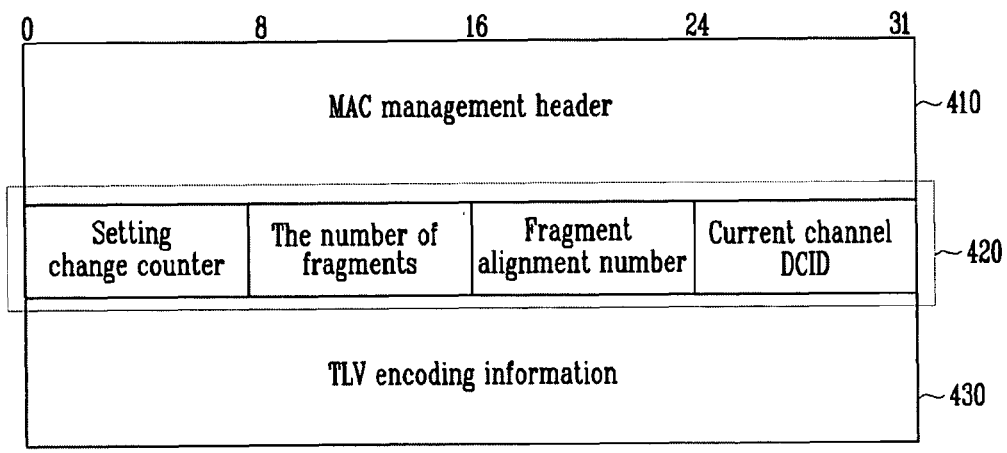
Figure 5A:
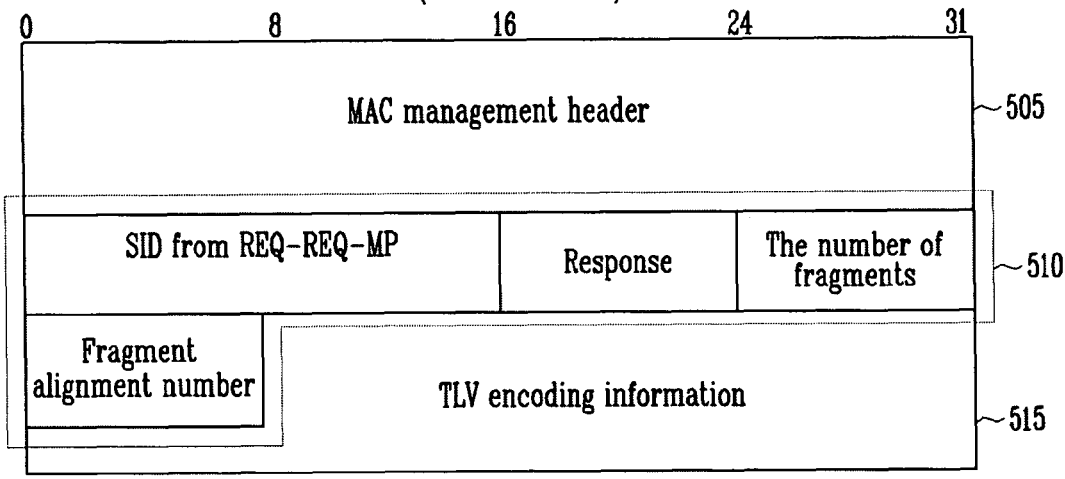
FIGS. 5a and 5b illustrate a format of a multipart registration response (REG-RSP-MP) message transmitted from a CMTS to a CM, and a TLV format, respectively.
Figure 5B:
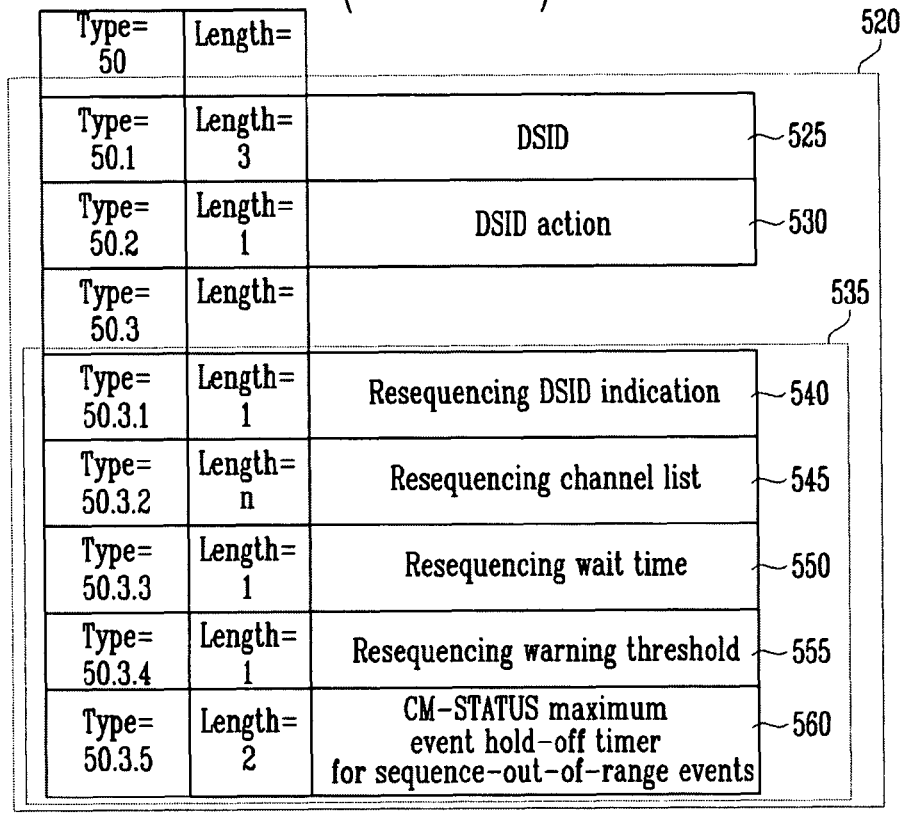
Figures 6A, 6B:
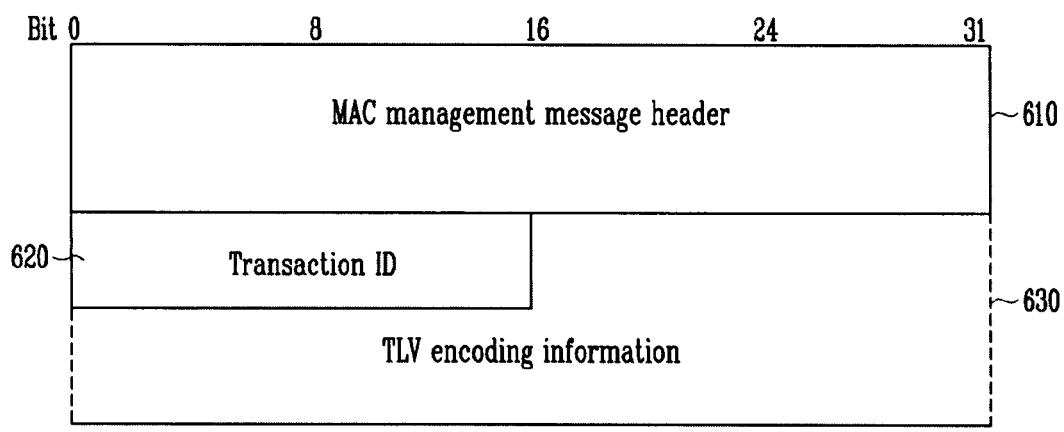
FIGS. 6a and 6b illustrate a format of a CM control request (CM-CTRL-REQ) message transmitted from a CMTS to a CM in order to instruct to perform a specific activity, and a TLV format, respectively.
Figure 7:
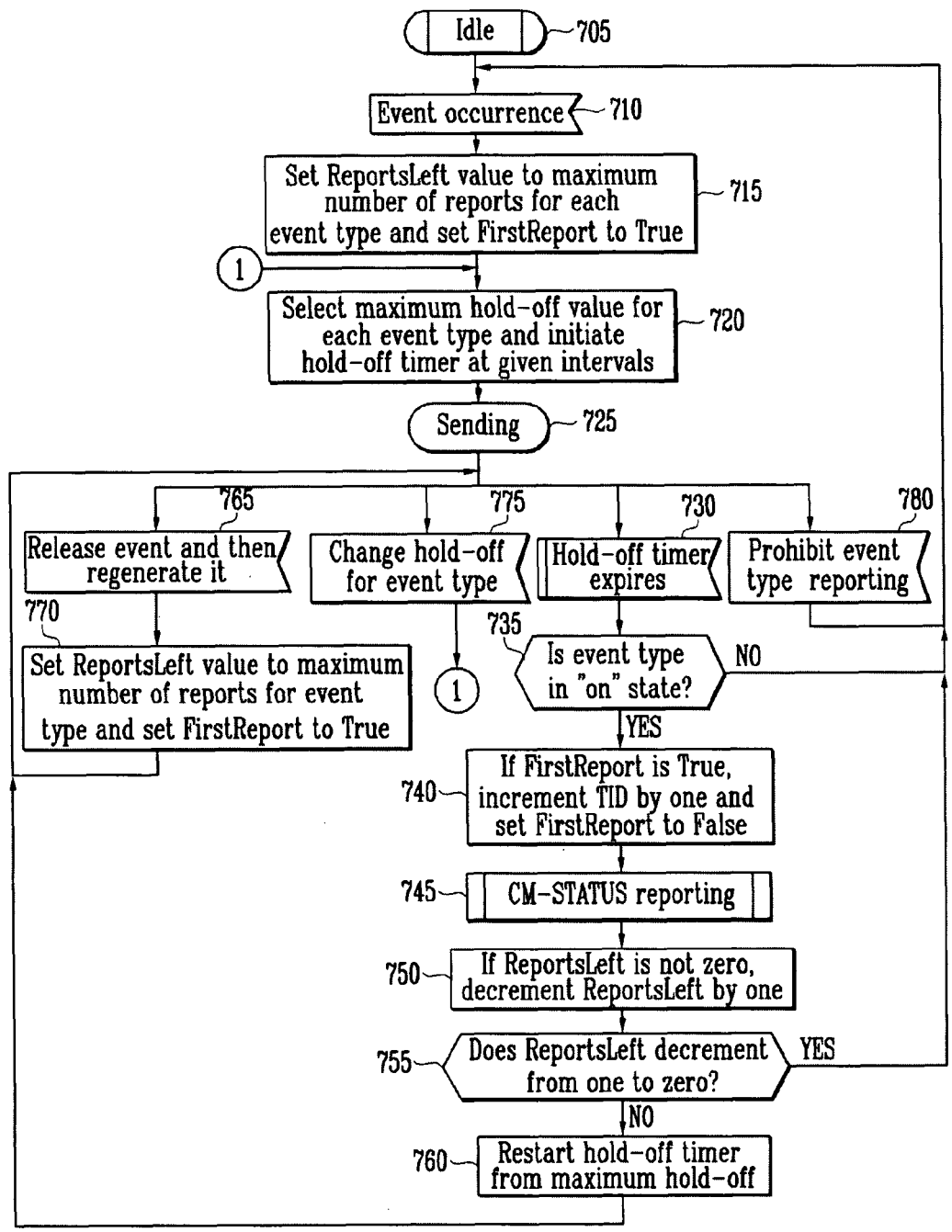
FIG. 7 illustrates a CM-STATUS event type state machine running on a CM.

Hereinafter, exemplary embodiments of the present invention will be described in detail. However, the present invention is not limited to the exemplary embodiments disclosed below, but can be implemented in various forms. Therefore, the following exemplary embodiments are described in order for this disclosure to be complete and enabling to those of ordinary skill in the art.

FIG. 9 illustrates a DSID encoding-related TLV format of an REG-RSP-MP message according to an exemplary embodiment of the present invention.

In the REG-RSP-MP message according to an exemplary embodiment of the present invention, packet resequencing-related events causing transmission of a CM-STATUS message may be further defined in a downstream resequencing encoding TLV 535 of type=50.3. A TLV format for describing parameters of the events may be added.

As one of the added events, there is an event for allowing the CM to transmit a CM-STATUS message when rapid loss detection is generated for resequenced packets with the same DSID. The rapid loss detection refers to the CM rapidly detecting that a packet with a specific PSN is lost, from the result of receiving packets over a plurality of downstream channels.

As another added event, there is a timeout event of packets stored in the resequencing process. Where any received resequenced packets are stored in the receive buffer for resequencing, the CM stores the packets only for a predetermined time in consideration of the limited capacity of the receive buffer. The stored packets may not be resequenced even after the predetermined time expires. This is called a resequencing packet timeout.

Finally, a periodic resequencing status reporting event may be added, which periodically reports the resequenced packet status.

The added events may be provided with a type code value capable of identifying an event from the event type code TLV 461 or 845 and with a bit location capable of identifying an event from the event enable bitmask TLV 442 or 660.

Referring to FIG. 9, the REG-RSP-MP message includes sub TLVs constituting a DSID encoding TLV 905 extended from the conventional DSID encoding TLV 520 to further define parameters related to the CM-STATUS message transmission for the added events. The sub TLVs include: a 2-byte CM-STATUS maximum event hold-off timer TLV 910 of type=50.3.6 for rapid loss detection events, which is applied upon occurrence of a rapid loss detection event; a 2-byte reporting period TLV 920 of type=50.3.7 for indicating a reporting period of a periodic resequencing status reporting event; and a 2-byte CM-STATUS maximum event hold-off timer TLV 940 of type=50.3.9 for a resequencing packet timeout event, which is applied upon occurrence of the resequencing packet timeout event.

Also, the CMTS may allocate a periodic band for CM-STATUS message transmission for a periodic status reporting event. The CMTS notifies the CM of the band allocation. To define a service ID for periodic resequencing status reporting ("R_SID") used upon the periodic band allocation, a SID TLV 930 for periodic resequencing reporting is further defined.

Figure 10:
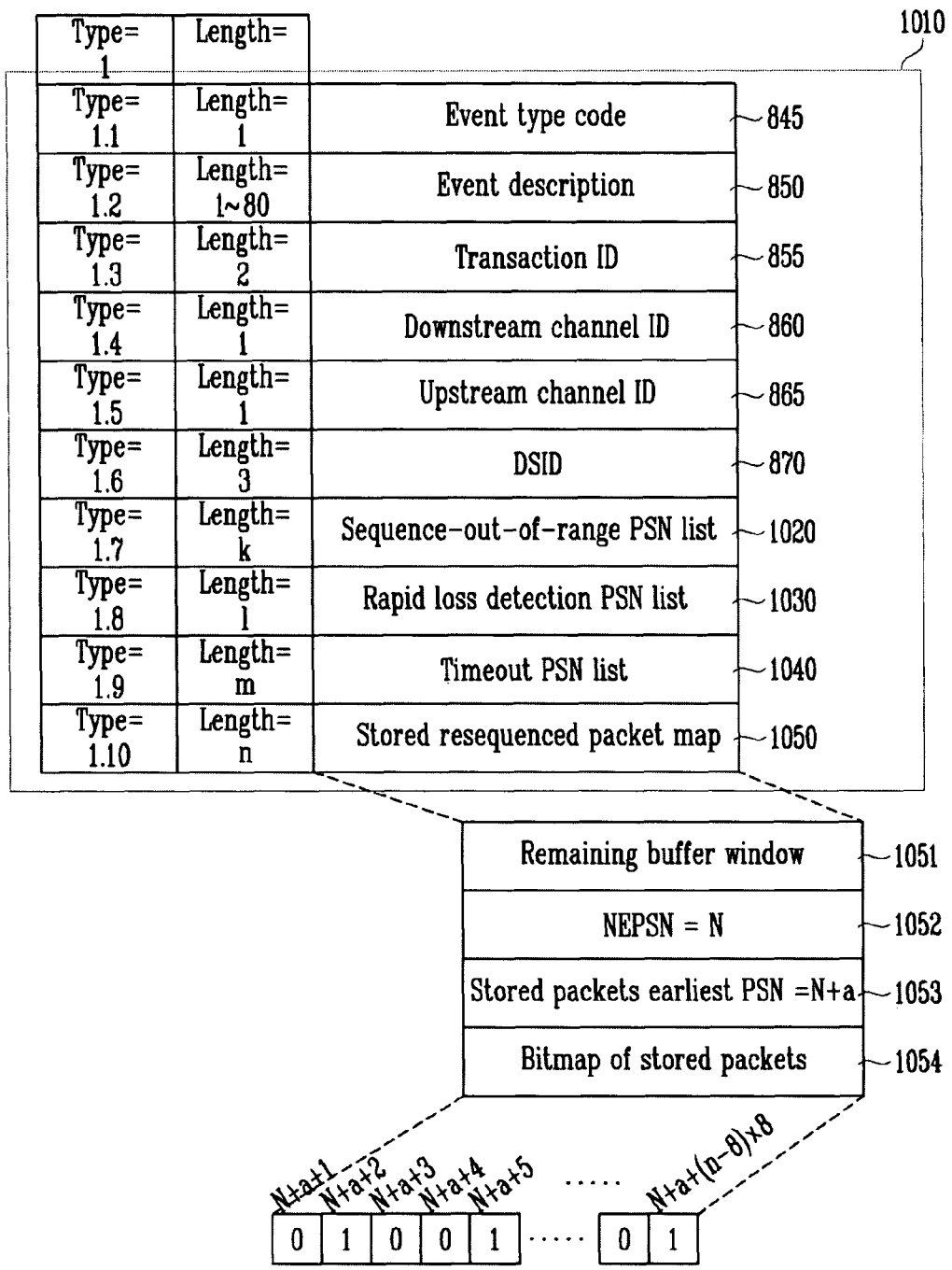
FIG. 10 illustrates a TLV format of a CM-STATUS message according to an exemplary embodiment of the present invention.

FIG. 10 illustrates a TLV format of a CM-STATUS message according to an exemplary embodiment of the present invention.

Referring to FIG. 10, the CM-STATUS message may have a status event TLV 1010 extended from the conventional status event TLV 840 and defined to include detailed resequencing status information. The extended status event TLV 1010 may include a sequence-out-of-range PSN list TLV 1020, a rapid loss detection event PSN list TLV 1030, a timeout PSN list TLV 1040, and a stored resequenced packet map TLV 1050. The sequence-out-of-range PSN list TLV 1020, the rapid loss detection event PSN list TLV 1030, and the timeout PSN list TLV 1040 are necessarily included upon occurrence of respective events and describe PSN values of the resequenced packets which cause the events, in a list form.

The stored resequenced packet map TLV 1050 is necessarily included upon occurrence of a periodic resequencing status reporting event. The stored resequenced packet map TLV 1050 may include a 4-byte remaining buffer window field 1051, a 2-byte next expected PSN field ("NEPSN") 1052, a 2-byte earliest PSN field 1053 for stored resequenced packets, and a bitmap field 1054 for the stored packets.

When the CM operates the receive buffer independently for each DSID, the remaining buffer window field 1051 may indicate a remaining window of a corresponding DSID receive buffer. The remaining buffer window field 1051 may indicate a remaining window of a packet buffer pool when the CM operates the receiver buffer as a packet buffer pool for all DSIDs.

Referring to FIG. 10, since a length field value of the stored resequenced packet map TLV 1050 is n, the bitmap field 1054 for the stored packets has a length of (n−8) bytes, i.e., (n−8)×8 bits as a result of subtraction of a sum of lengths of the other fields, 8, from n. In the stored packet bitmap field 1054, a first bit indicates whether there is a packet having a PSN greater by one than N+a, which is the PSN minimum value 1053 of the stored resequenced packets, and a last bit indicates whether there is a packet having a PSN greater by (n−8)×8 than N+a.

Figure 11:
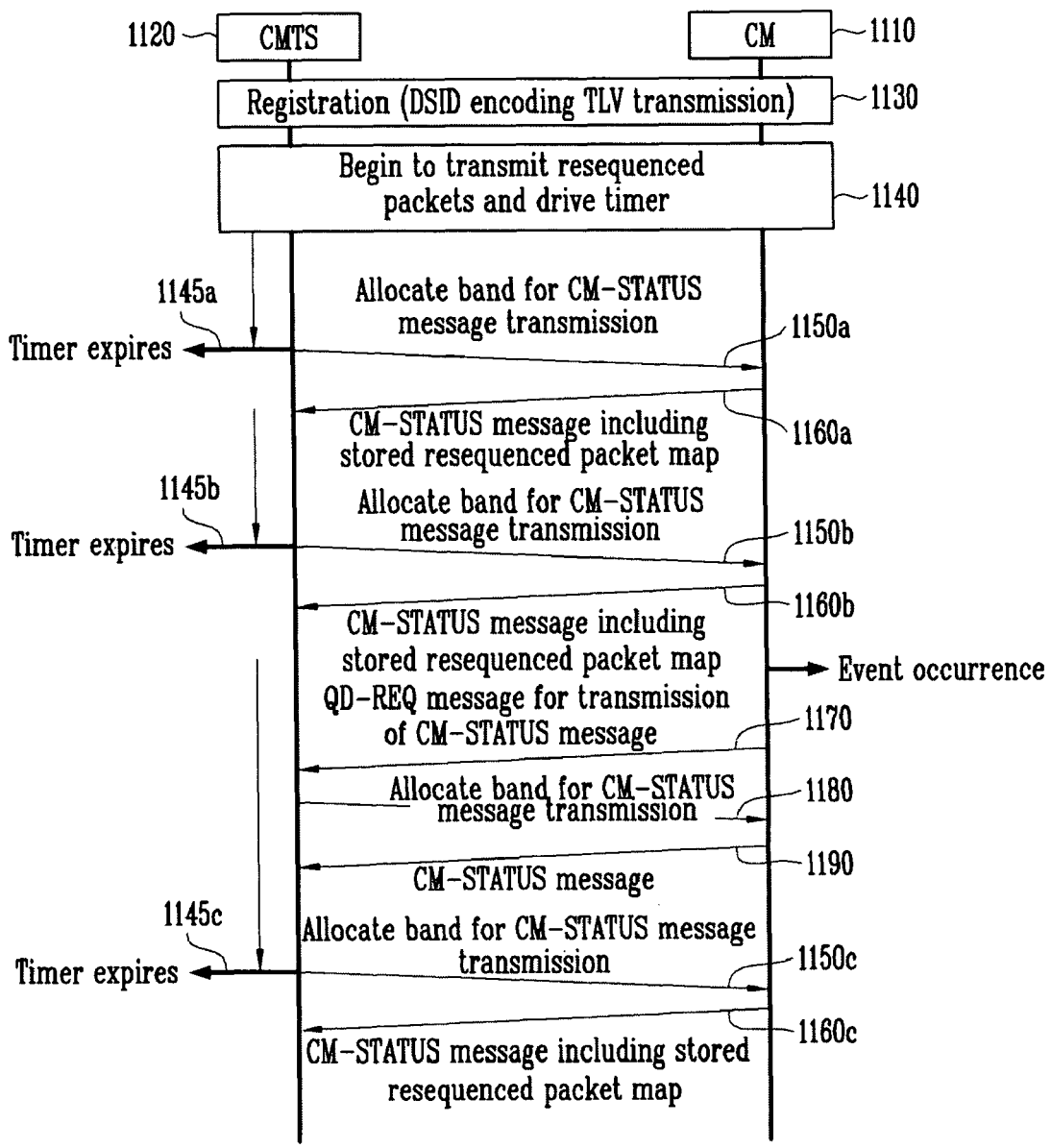
FIG. 11 illustrates a process of transmitting a CM-STATUS message according to an exemplary embodiment of the present invention.

FIG. 11 illustrates a process of transmitting the CM-STATUS message according to an exemplary embodiment of the present invention.

For initialization, the CMTS 1120 transmits the extended DSID encoding TLV 905 information via the REG-RSP-MP message to the CM 1110 and registers DSID and resequencing related event reporting information (1130).

After the initialization process is completed, the CMTS 1120 begins to transmit resequenced packets to the CM 1110 and drives a timer for periodic resequencing status reporting (1140). During the transmission by the CMTS 1120 of the resequenced packets, the timer expires in a predetermined period (1145a to 1145c). Upon each expiration of the timer, the CMTS 1120 automatically allocates an upstream channel band for CM-STATUS message transmission to the CM 1110 even without a separate request (1150a to 1150c). The upstream channel band allocation may be performed by using R_SID.

The CM 1110, after allocated the band, transmits a CM-STATUS message including the stored resequenced packet map TLV 1050 to the CMTS 1120 (1160a to 11160c).

If, during the reception by the CM 1110 of the resequenced packets, one of the sequence-out-of-range event, the rapid loss detection event or the resequencing packet timeout event occurs (1165), the CM performs hold-off using the hold-off timer value defined for each event and generates the CM-STATUS message. After generating the CM-STATUS message, the CM 1110 requests an upstream band resource by using the QD-REQ message for transmission of the CM-STATUS message (1170).

After receiving the QD-REQ message 1170, the CMTS 1120 allocates the resource for transmission of the CM-STATUS message (1180), and the CM 1110 transmits the CM-STATUS message containing the event-related TLV (1190). In this case, the CM-STATUS message may optionally include a stored resequenced packet map TLV 1050.

In an exemplary embodiment, upon receipt of the resequencing status information fed back from the CM, the CMTS may adjust a transmission rate for the resequenced packets so that the packets are lost. When the packets are lost, the CMTS may perform packet re-transmission.

Figure 12:
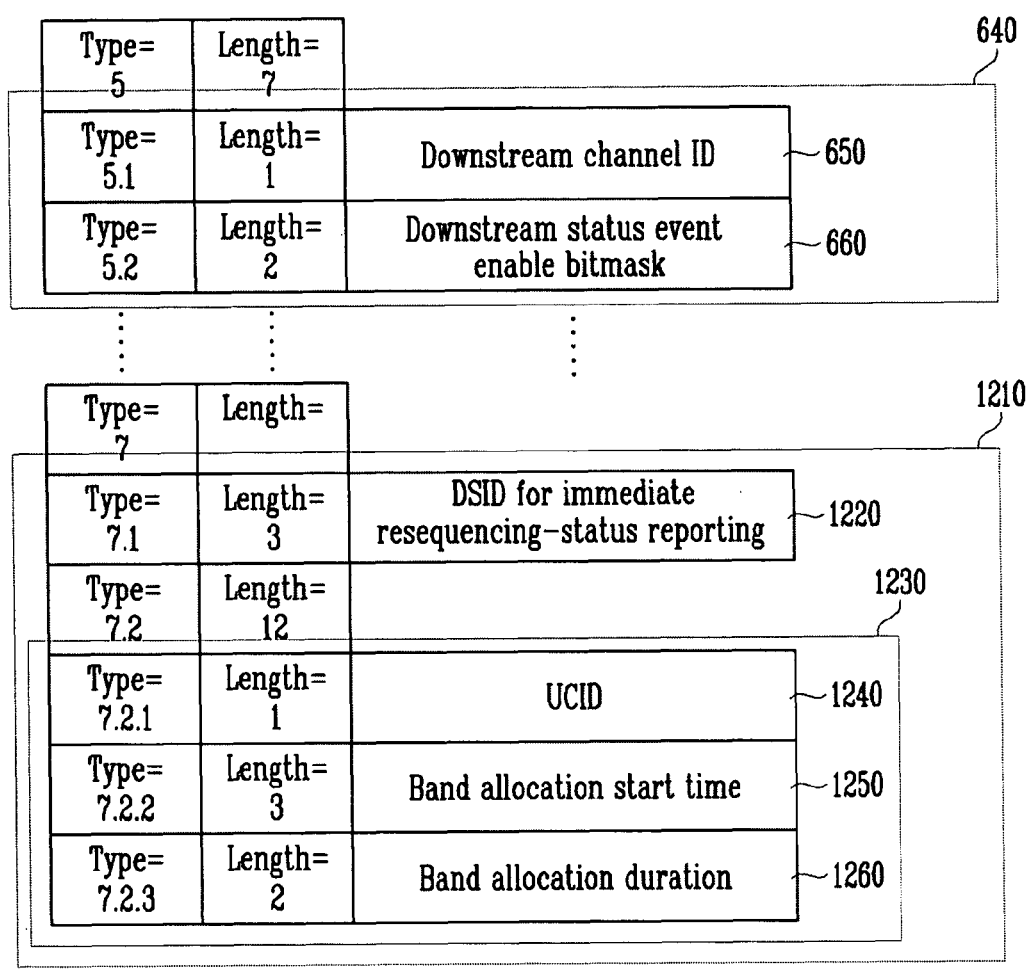
FIG. 12 illustrates a TLV format of a CM-CTRL-REQ message according to an exemplary embodiment of the present invention.

FIG. 12 illustrates a TLV format of a CM-CTRL-REQ message according to an exemplary embodiment of the present invention.

Referring to FIG. 12, the CM-CTRL-REQ message may further include a request TLV 1210 represented by Type=7 and defined to instruct the CM to immediately report resequenced packet status information.

The request TLV 1210 for immediately reporting the resequenced packet status information may include sub TLVs, such as a 3-byte DSID TLV 1220 of type=7.1 for immediate resequencing-status reporting, and a 12-byte immediate reporting method TLV 1230 of type=7.2.

The DSID TLV 1220 for immediate resequencing-status reporting indicates DSIDs of packets requested for resequenced packet status reporting, and the immediate reporting method TLV 1230 describes a method by which the CM transmits the CM-CTRL-RSP message in response to the CM-CTRL-REQ message.

In an exemplary embodiment, the CMTS may allocate a band for CM-CTRL-RSP message transmission to the CM by using the CM-CTRL-REQ message. To this end, the immediate reporting method TLV 1230 may include sub TLVs, such as a 1-byte upstream channel ID ("UCID") TLV 1240 of type=7.2.1, a 3-byte band allocation start time ("AllocStartTime") TLV 1150 of type=7.2.2, and a 2-byte band allocation duration TLV 1160 of type=7.2.3.

Figure 13:
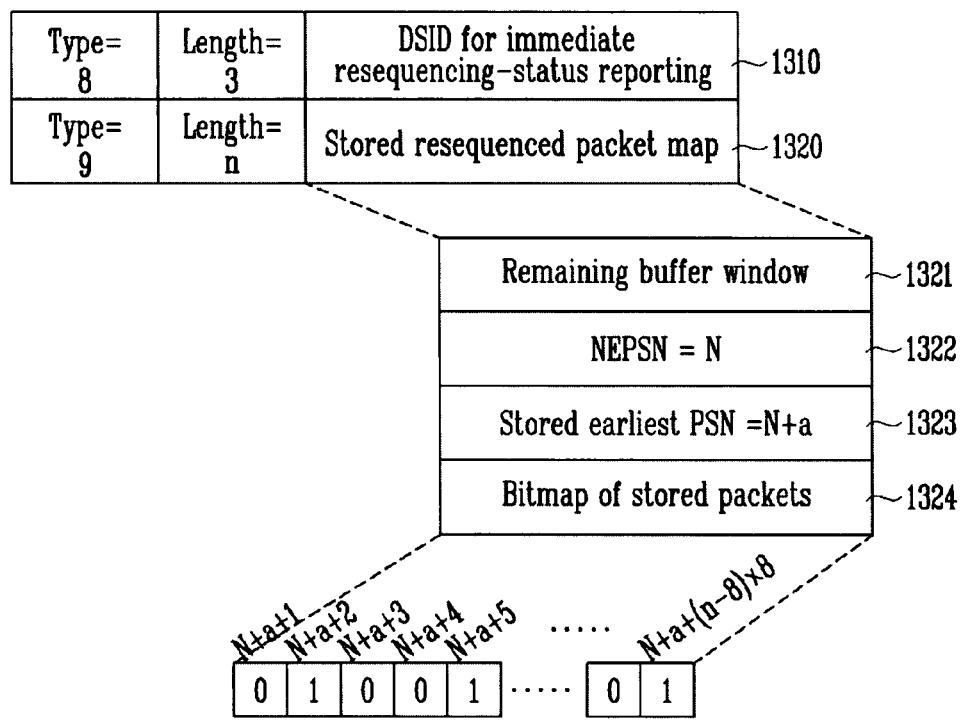
FIG. 13 illustrates a format of an additive TLV of a CM-CTRL-RSP message according to an exemplary embodiment of the present invention.

FIG. 13 illustrates a format of an additive TLV of the CM-CTRL-RSP message according to an exemplary embodiment of the present invention.

In an exemplary embodiment, upon receipt of the CM-CTRL-REQ message containing the request TLV 1210 for immediately reporting resequenced packet status information, the CM immediately reports to the CMTS a stored state of the resequenced packets having a DSID of the DSID TLV 1220 for immediate resequencing-status reporting by means of the CM-CTRL-RSP message.

The CM-CTRL-RSP message for reporting may include a 3-byte DSID TLV 1310 of Type=8 for immediate resequencing-status reporting that has the same value as the DSID TLV 1220 for immediate resequencing-status reporting included in the CM-CTRL-REQ message, and a stored resequenced packet map TLV 1320 of Type=9 that has a variable length. Referring to FIG. 13, the stored resequenced packet map TLV 1320 may include a remaining buffer window field 1321, an NEPSN field 1322, an earliest PSN field 1323 for stored resequenced packets, and a bitmap field 1324 for stored packets, like the stored resequenced packet map TLV 1050 shown in FIG. 10.

FIG. 14 illustrates a process of exchanging the CM-CTRL-REQ message and the CM-CTRL-RSP message according to an exemplary embodiment of the present invention.

For initialization, the CMTS 1420 transmits the extended DSID encoding TLV 905 information via the REG-RSP-MP message to the CM 1410 and registers the DSID and resequencing related event reporting information (1430). Following the initialization, during the transmission of the resequenced packet to the CM 1410 (1440), the CMTS 1420 may transmit, to the CM, a CM-CTRL-REQ message containing a request TLV 1210 of Type=7 for immediately reporting resequenced packet status information (1450).

Upon receipt of the CM-CTRL-REQ message, the CM 1410 first recognizes the DSID TLV 1220 of Type=7.1 for immediate resequencing-status reporting and generates a CM-CTRL-RSP message containing the DSID TLV 1310 of Type=8 for immediate resequencing-status reporting and the stored resequenced packet map TLV 1320 of Type=9. Using the band resource allocated via the immediate reporting method TLV 1230 of Type=7.2 in the CM-CTRL-REQ message received from the CMTS 1420 (1451), the CM 1410 transmits the generated CM-CTRL-RSP message to the CMTS 1420 (1452).

Alternatively, the CMTS 1420 may transmit the CM-CTRL-REQ message without the immediate reporting method TLV 1230 of Type=7.2 to the CM 1410 (1460). In this case, since further band allocation is required for CM-CTRL-RSP message transmission, the CM 1410 transmits a QD-REQ message for band allocation to the CMTS 1420 in step 1461. The CM is then allocated the band resource from the CMTS (1462). The CM 1410 transmits the CM-CTRL-RSP message by using the allocated band resource (1463).

According to the present invention, more detailed resequencing status information, such as the remaining capacity of the receive buffer and the resequenced packet map, for more packet resequencing-related events compared to the conventional downstream packet resequencing status reporting method is transmitted to the CMTS, such that the CMTS copes more flexibly with situations that may occur upon packet resequencing.

Further, the resequencing status is reported upon event occurrence, as well as in a predetermined period and upon a CMTS's request, which may be selected according to a policy of the CMTS.

Furthermore, the upstream band for resequencing status reporting performed periodically or in response to the CMTS's request is allocated in advance without the request from the CM, thereby improving rapidity of the reporting and conserving resources.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method by which a cable modem receiving resequenced packets over a plurality of channels reports a resequencing status of the resequenced packets, the method comprising the steps of:
  (a) when a packet resequencing-related event occurs, generating a resequencing status message (CM-STATUS) in which packet sequence numbers (PSN) of the resequenced packets causing the event are recorded on a field designated for the event, the resequencing status message including a sequence-out-of-range PSN list TLV, a rapid loss detection event PSN list TLV, and a timeout PSN list TLV, wherein the resequencing status message comprises a map of the resequenced packets stored in the cable modem, the map of the stored resequenced packets comprises at least one of a remaining window of a receive buffer of the cable modem, a next expected packet sequence number, an earliest packet sequence number of the stored resequenced packets, and a stored packet bitmap;
  (b) transmitting a band allocation request message for requesting a cable modem termination system to allocate an upstream band for transmission of the resequencing status message; and
  (c) transmitting the resequencing status message to the cable modem termination system over the upstream band allocated by the band allocation request message.

2. The method of claim 1, wherein the event comprises a rapid loss detection event.

3. The method of claim 1, wherein the event further comprises a resequencing packet timeout event occurring at a receive buffer of the cable modem.

4. A method by which a cable modem receiving resequenced packets over a plurality of channels reports a resequencing status of the resequenced packets, the method comprising the steps of:
  (a) generating a resequencing status message at the cable modem in a predetermined period, wherein the resequencing status message includes a map of the resequenced packets stored in the cable modem, the map of the resequenced packets includes a remaining window of a receive buffer of the cable modem, an earliest packet sequence number of the stored resequenced packets, a next expected packet sequence number and a stored packet bitmap;
  (b) allocating to the cable modem, by a cable modem termination system, an upstream band for transmission of the resequencing status message in the predetermined period; and
  (c) transmitting the resequencing status message to the cable modem termination system over the allocated upstream band.

5. The method of claim 4, wherein step (b) comprises allocating the upstream band using a service ID for periodic reporting.

6. A method by which a cable modem receiving resequenced packets over a plurality of channels reports a resequencing status of the resequenced packets, the method comprising the steps of:
  (a) receiving a request message (CM-CTRL-REQ) from a cable modem termination system, the request message requesting the cable modem to report the resequencing status, the request message comprising upstream band allocation information for transmission of a response message, the upstream band allocation information including an upstream channel ID (UCID), a band allocation start time, and a band allocation duration;
  (b) generating the response message (CM-CTRL-RSP) in response to the request message, wherein the response message comprises a map of the resequenced packets stored in the cable modem, wherein the map of the resequenced packets stored in the cable modem comprises a remaining window of a receive buffer of the cable modem, a next expected packet sequence number, an earliest packet sequence number of the stored resequenced packets, and a stored packet bitmap;
  (c) allocating to the cable modem, by the cable modem termination system, an upstream band for transmission of the response message; and
  (d) transmitting the response message to the cable modem termination system over the allocated upstream band.

7. The method of claim 6, wherein step (c) comprises allocating the upstream band by using the upstream band allocation information.

8. The method of claim 6, further comprising, before step (c), the step of transmitting a band allocation request message for requesting the cable modem termination system to allocate the upstream band for transmission of the response message.

* * * * *